United States Patent
Deluca et al.

(10) Patent No.: US 10,990,895 B2
(45) Date of Patent: *Apr. 27, 2021

(54) PREDICTING API STORYTELLING MAPPING

(71) Applicant: International Business Machines Corporation, Armonk, NY (US)

(72) Inventors: Marco A. Deluca, Ontario (CA); Leho Nigul, Ontario (CA)

(73) Assignee: International Business Machines Corporation, Armonk, NY (US)

(*) Notice: Subject to any disclaimer, the term of this patent is extended or adjusted under 35 U.S.C. 154(b) by 1149 days.

This patent is subject to a terminal disclaimer.

(21) Appl. No.: 15/399,766

(22) Filed: Jan. 6, 2017

(65) Prior Publication Data

US 2017/0213152 A1    Jul. 27, 2017

Related U.S. Application Data

(63) Continuation of application No. 15/006,491, filed on Jan. 26, 2016, now Pat. No. 9,626,627.

(51) Int. Cl.

| G06F 15/18 | (2006.01) |
|---|---|
| G06N 20/00 | (2019.01) |
| G06N 7/00 | (2006.01) |
| G06F 8/36 | (2018.01) |
| G06F 8/33 | (2018.01) |
| G06F 9/54 | (2006.01) |
| G06N 3/08 | (2006.01) |
| G06N 20/10 | (2019.01) |

(52) U.S. Cl.
CPC ............... *G06N 20/00* (2019.01); *G06F 8/33* (2013.01); *G06F 8/36* (2013.01); *G06F 9/54* (2013.01); *G06N 7/005* (2013.01); *G06N 3/08* (2013.01); *G06N 20/10* (2019.01)

(58) Field of Classification Search
CPC ........ G06N 99/005; G06N 5/00; G06N 5/025; G06N 7/005; G06F 9/4881
See application file for complete search history.

(56) References Cited

U.S. PATENT DOCUMENTS

| 5,627,998 A | 5/1997 | Mondrik et al. |
| 8,756,568 B2 | 6/2014 | Hale et al. |
| 8,819,629 B2 | 8/2014 | Sherrill |
| 9,092,276 B2 | 7/2015 | Allen et al. |

(Continued)

FOREIGN PATENT DOCUMENTS

WO    2015047467 A1    4/2015

OTHER PUBLICATIONS

Appendix P—List of IBM Patents or Patent Applications Treated as Related, Filed Jan. 6, 2017, 2 Pages.

(Continued)

*Primary Examiner* — Luis A Sitiriche
(74) *Attorney, Agent, or Firm* — Alexander G. Jochym

(57) ABSTRACT

A first indication from a user is received. The indication includes a task to be performed using at least one application programming interface. A machine learning model is determine. At least one application programming interface is determined using the machine learning model and the request. The at least one application programming interface is provided to the user.

14 Claims, 4 Drawing Sheets

(56) References Cited

U.S. PATENT DOCUMENTS

| | | | |
|---|---|---|---|
| 2014/0124580 A1* | 5/2014 | Yang | H04M 1/72519 |
| | | | 235/462.1 |
| 2014/0237457 A1 | 8/2014 | Munshi et al. | |
| 2016/0019471 A1* | 1/2016 | Shin | G06F 9/4881 |
| | | | 706/12 |
| 2016/0057107 A1 | 2/2016 | Call et al. | |
| 2016/0085521 A1* | 3/2016 | Savliwala | G06F 16/22 |
| | | | 717/108 |

OTHER PUBLICATIONS

Judd, Stephen; "Rest API tooling review"; Documenting Rest APIs—a tooling review; Printed Nov. 11, 2015; Copyright 2015 Open Source Software Development Consultancy; London; pp. 9; <https://www.opencredo.com/2015/07/28/rest-api-tooling-review/.

Sated, M.A. et al.; "Could We Inter Unordered API Usage Patterns Only Using the Library Source Code?"; Program Comprehension (ICPC); 2015 IEEE 23rd International Conference on Program Comprehension; May 18-19, 2015; Florence; pp. 71-81.

Unknown; "A Powerful Interface to Your API"; SWAGGER—The World's Most Popular Framework for APIs; Printed Nov. 11, 2015; Copyright 2015 Swagger; pp. 1-3; <http://swagger.io/.

Zhong et al., "MAPO: Mining and Recommending API Usage Patterns", ECOOP, LNCS 5653, pp. 318-343, © Springer-Verlag Berlin Heidelberg.

DeLuca et al., "Predicting API Storytelling Mapping", U.S. Appl. No. 15/006,491, filed Jan. 26, 2016, 27 pages.

* cited by examiner

PREDICTING API STORYTELLING MAPPING

BACKGROUND

The present invention relates generally to the field of application program interface (API), and more particularly to API storyboards based on requests of a user.

An API is a set or group of routines, protocols, and/or tools for building or creating software applications. The API specifies how software components should interact and APIs can be used when programming graphical user interface components. An API expresses a software component in terms of the operations, inputs, outputs, and underlying types of the software components. The API can define functionalities that are independent of their respective implementation and this allows definitions and implementations to vary without comprising the interface.

SUMMARY OF THE INVENTION

Embodiments of the present invention include a method, computer program product, and system for predicting application programming interface storytelling mapping. In one embodiment, a first indication from a user is received. The indication includes a task to be performed using at least one application programming interface. A machine learning model is determine. At least one application programming interface is determined using the machine learning model and the request. The at least one application programming interface is provided to the user.

DETAILED DESCRIPTION OF THE PREFERRED EMBODIMENTS

Embodiments of the present invention provide for predicting application programming interface storytelling mapping. Embodiments of the present invention provide for receiving a request from a user to solve a problem or complete a task. Embodiments of the present invention provide for determining a group of storyboards or API(s) that will solve the request received previously. Embodiments of the present invention provide for presenting the group of storyboards or API(s) to the user. Embodiments of the present invention allow for filtering the group of storyboards or API(s). Embodiments of the present invention allow for presenting a modified group of storyboards or API(s) based on the filtering requested. Embodiments of the present invention allow for presenting the modified group of storyboards or API(s) to the user. Embodiments of the present invention recognize that the term storyboards may be used interchangeably with API(s) or a group of API(s).

Embodiments of the present invention recognize that developers need to evaluate each product (i.e., API) to determine if the API supports the required capabilities and functionality needed by the developer. Embodiments of the present invention recognize that there is an ever increasing large amount of APIs that span a wide range of capabilities. Embodiments of the present invention recognize that a developer needs to piece together API invocation patterns through reading documents, following examples, or trial and error. Embodiments of the present invention recognize that API connections are not obvious. Embodiments of the present invention recognize that storyboards (i.e., groupings of APIs that perform a function) can be very complex.

The present invention will now be described in detail with reference to the Figures.

Figure 1:
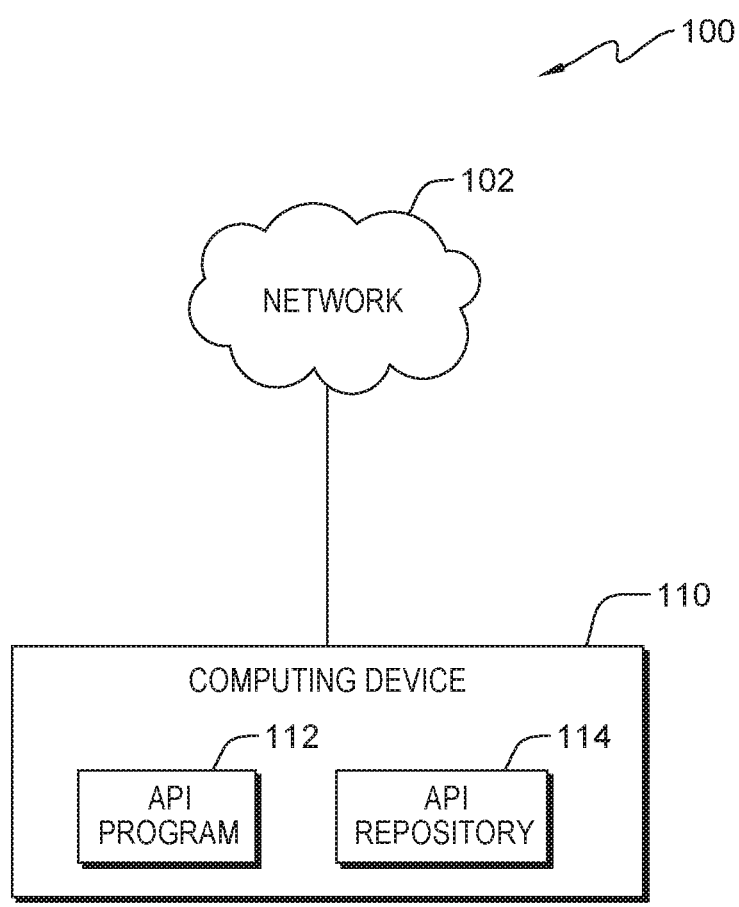
FIG. 1 depicts a functional block diagram of a data processing environment, in accordance with an embodiment of the present invention.

FIG. 1 is a functional block diagram illustrating a data processing environment, generally designated 100, in accordance with one embodiment of the present invention. FIG. 1 provides only an illustration of one implementation and does not imply any limitations with regard to the systems and environments in which different embodiments may be implemented. Many modifications to the depicted embodiment may be made by those skilled in the art without departing from the scope of the invention as recited by the claims.

An embodiment of data processing environment 100 includes computing device 110 interconnected over network 102. Network 102 can be, for example, a local area network (LAN), a telecommunications network, a wide area network (WAN) such as the Internet, or any combination of the three, and include wired, wireless, or fiber optic connections. In general, network 102 can be any combination of connections and protocols that will support communications between computing device 110 and any other computer connected to network 102, in accordance with embodiments of the present invention.

In an embodiment, computing device 110 may be a laptop, tablet, or netbook personal computer (PC), a desktop computer, a personal digital assistant (PDA), a smart phone, camera, video camera, video device or any programmable electronic device capable of communicating with any computing device within data processing environment 100. In certain embodiments, computing device 110 collectively represents a computer system utilizing clustered computers and components (e.g., database server computers, application server computers, etc.) that act as a single pool of seamless resources when accessed by elements of data processing environment 100, such as in a cloud computing environment, discussed previously. In general, computing device 110 is representative of any electronic device or combination of electronic devices capable of executing computer readable program instructions. In an embodiment, computing device 110 may include components as depicted and described in detail with respect to FIG. 3, in accordance with embodiments of the present invention.

In an embodiment, computing device 110 includes application programming interface (API) program 112 and API repository 114. In an embodiment, API program 112 is a program, application, or subprogram of a larger program that predicts API storytelling mapping. Storytelling mapping, in reference to APIs, is an organized layout of multiple APIs to perform an overall task. Additionally, storytelling mapping is a set of APIs that are used in conjunction with each other to perform an overall task. For example, the storytelling mapping for perform an eCommerce checkout flow (i.e., a checkout process integrated with a sales application) may include an AddToCart API, CheckInventor API, UpdateCartPrice API, AddCoupon API, etc. and each of these APIs perform specific functions. In an alternative embodiment, API program 112 may be located on any other device accessible by computing device 110 via network 102. In an embodiment, API repository 114 may include information about APIs and the applications the APIs are commonly found in including the frequency of the order the APIs are found in applications. In an alternative embodiment, API repository 114 may be located on any other device accessible by computing device 110 via network 102.

In an embodiment, API program 112 may predict API storytelling mapping based on input received from a user. In an embodiment, API program 112 may receive a request from a user to perform a task that solves a problem in an API environment. In an embodiment, API program 112 determines at least one storyboard (i.e., API patterns) to solve the problem using the information found in API repository 114. In an embodiment, API program 112 presents the storyboard(s) to the user and the storyboard(s) include one or more API to solve the problem presented by the user. In an embodiment, API program 112 receives input from a user to filter the previously presented storyboard(s). In an embodiment, API program 112 determines a modified at least one storytelling mapping to solve the problem using the information found in API repository 114. In an embodiment, API program 112 presents the modified storyboard(s) to the user and the modified storyboard(s) include one or more API to solve the problem presented by the user. In an embodiment, API program 112 determines the at least one storyboard using a machine learning model and when a user makes changes to the determined at least one storyboard the machine learning model is updated.

A machine learning model includes the construction and implementation of algorithms that can learn from and make predictions on data. The algorithms operate by building a model from example inputs in order to make data-driven predictions or decisions, rather than following strictly static program instructions. In an embodiment, the model is a system which explains the behavior of some system, generally at the level where some alteration of the model predicts some alteration of the real-world system. In an embodiment, a machine learning model may be used in a case where the data becomes available in a sequential fashion, in order to determine a mapping from the dataset to corresponding labels. In an embodiment, the goal of the machine learning model is to minimize some performance criteria using a loss function. In an embodiment, the goal of the machine learning model is to minimize the number of mistakes when dealing with classification problems. In yet another embodiment, the machine learning model may be any other model known in the art. In an embodiment, the machine learning model may be a SVM "Support Vector Machine". In an alternative embodiment, the machine learning model may be any supervised learning regression algorithm. In yet another embodiment, the machine learning model may be a neural network.

In any embodiment, API program 112 includes a user interface. A user interface is a program that provides an interface between a user and an application. A user interface refers to the information (such as graphic, text, and sound) a program presents to a user and the control sequences the user employs to control the program. There are many types of user interfaces. In one embodiment, the user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computers, GUIs were introduced in reaction to the perceived steep learning curve of command-line interfaces, which required commands to be typed on the keyboard. The actions in GUIs are often performed through direct manipulation of the graphics elements. For example, client application may be a web browser, a database program, etc.

In an embodiment, computing device 110 may include API repository 114. In an embodiment, API repository 114 may include information about preset storyboards that include one or more APIs that are grouped together to perform a certain task. In an embodiment, the preset storyboards may be created by a user specifically for certain tasks. In an alternative embodiment, the preset storyboards may be created from information about preset storyboards from applications that are input into API program 112 for determining optimal and common storyboards that have an order or combination of APIs to perform a certain task. In an embodiment, API repository 114 may include information for refining/filtering API storyboards (i.e. storyboards for finance applications, retail applications, electronic goods applications, etc.). In an embodiment, API repository 114 may include information about links between APIs, including how information is passed between APIs and APIs that function together. In an embodiment, information about storyboards used in already created applications may be input into API repository 114 and if there are updates to the storyboards used in already created applications this would be input into API repository 114. In an embodiment, API repository 114 may include a machine learning model used to determine storyboards to perform certain tasks and the machine learning model may be updated based on user input. In an embodiment, API repository 114 may include a machine learning model applied to a group as a whole or smaller subsets of machine learning model(s) that may be applied to smaller subset groups.

API repository 114 may be implemented using any volatile or non-volatile storage media for storing information, as known in the art. For example, API repository 114 may be implemented with a tape library, optical library, one or more independent hard disk drives, multiple hard disk drives in a redundant array of independent disks (RAID), solid-state drives (SSD), or random-access memory (RAM). Similarly, API repository 114 may be implemented with any suitable storage architecture known in the art, such as a relational database, an object-oriented database, or one or more tables.

Figure 2:
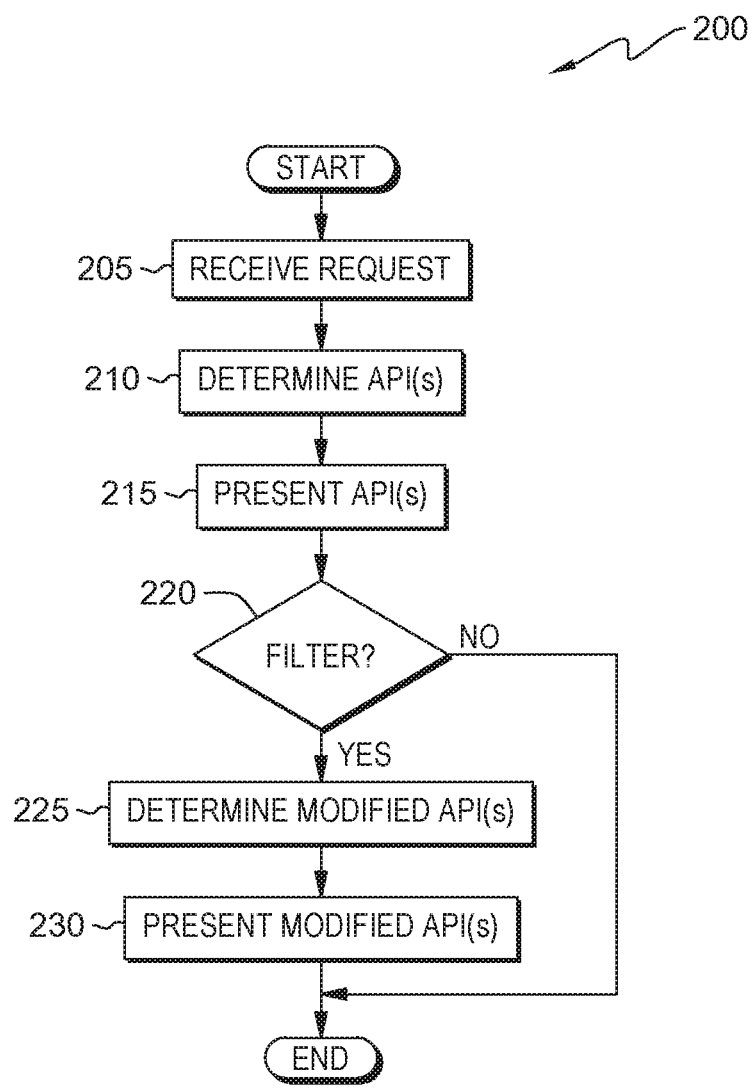
FIG. 2 depicts a flowchart of operational steps of a program for predicting application programming interface storytelling mapping, in accordance with an embodiment of the present invention.

FIG. 2 is a flowchart of workflow 200 depicting operational steps for predicting API storytelling mapping based on input received from a user. In one embodiment, the steps of the workflow 200 are performed by API program 112. In an alternative embodiment, steps of the workflow can be performed by any other program while working with API program 112. In a preferred embodiment, a user, via a user interface discussed previously, can invoke workflow 200 upon determining that the user has a task that could be solved using storytelling mapping in an API environment.

Figure 3:
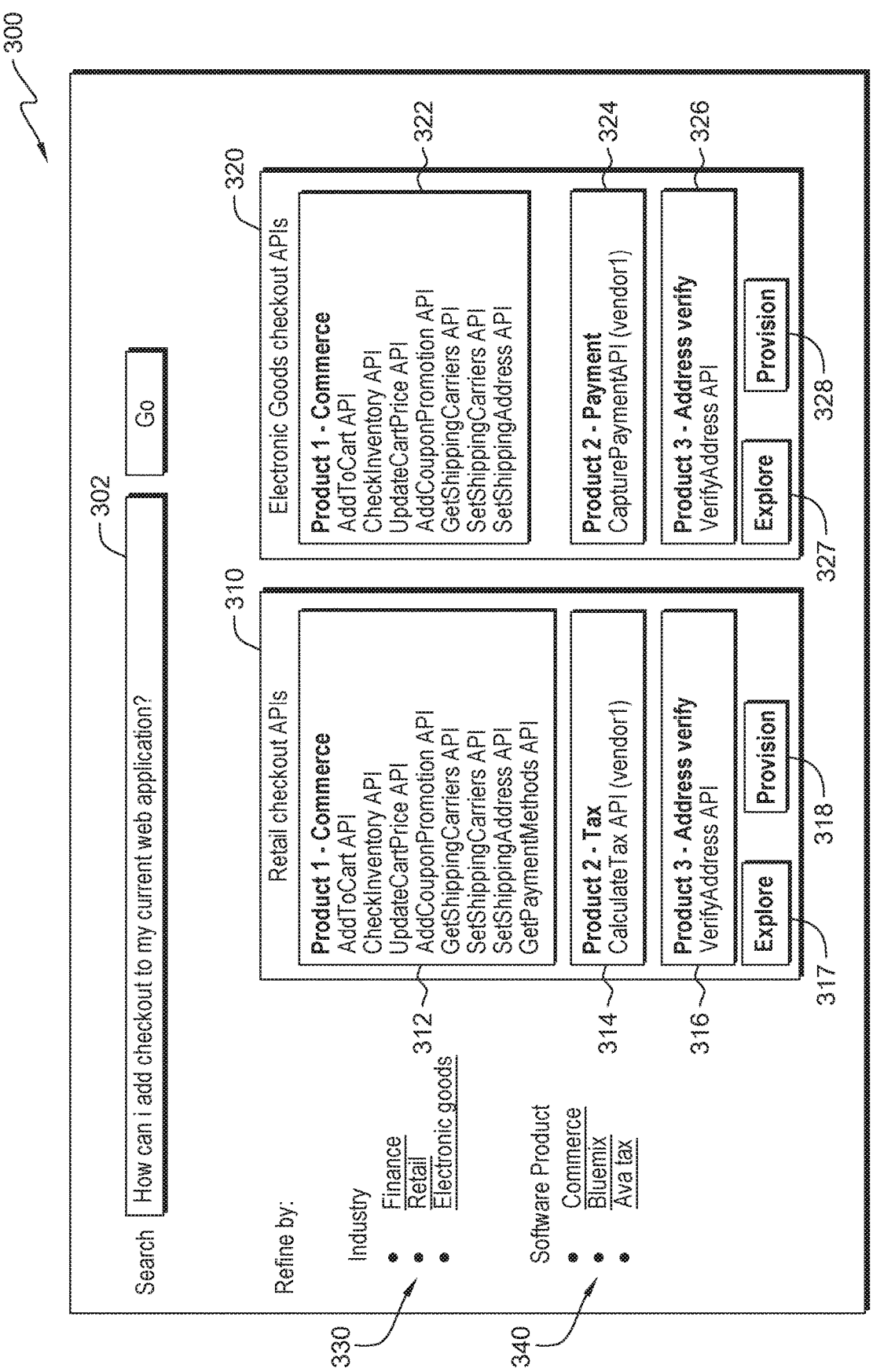
FIG. 3 depicts an example user interface for a program for predicting application programming interface storytelling mapping, in accordance with an embodiment of the present invention.
Figure 4:
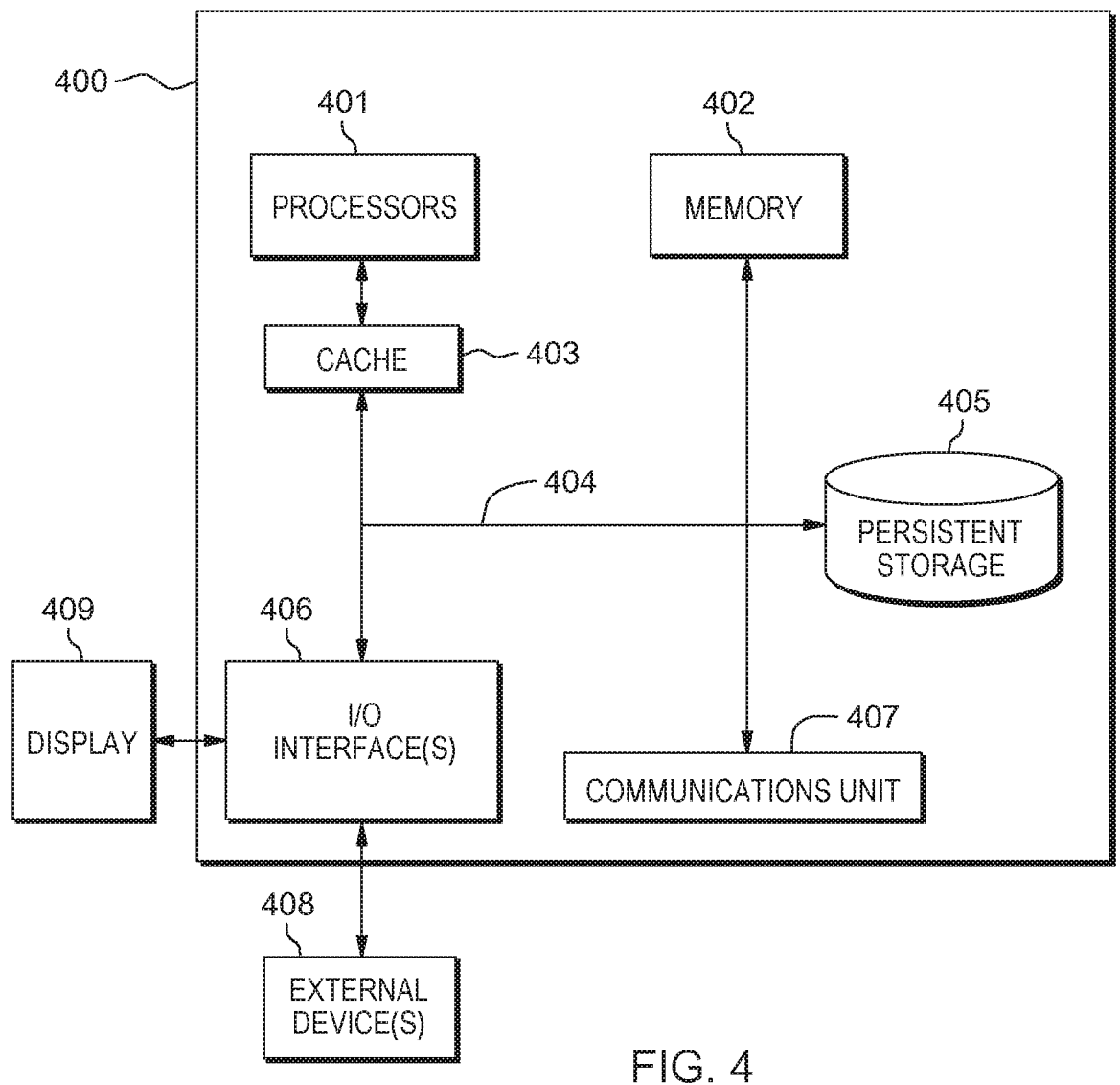
FIG. 4 depicts a block diagram of components of the computer of FIG. 1, in accordance with an embodiment of the present invention.

FIG. 3 is an example user interface 300 for a program for predicting application programming interface storytelling mapping, in accordance with an embodiment of the invention. FIG. 3 will be used as an example throughout the discussion of workflow 200.

API program 112 receives a request (step 205). In an embodiment, API program 112 may receive a request to perform a task from user via a user interface, discussed previously. For example, as shown in FIG. 3, a user may request, via the user interface, that the user would like to know "How can I add checkout to my current web application?" 302. API program 112 performs natural language processing on the request to determine the task or a problem to be solved by the request. For example, here API program 112 may determine that "checkout" is an API service that the user would like to add to the "web application" of the user. In an alternative embodiment, API program 112 may receive the request from a program or operating system of a device that indicates that a certain task needs to be performed in a API environment. In an embodiment, API program 112 may request additional information from the user if API program 112 cannot determine what the user is requesting.

Natural language processing is a field of computer science, artificial intelligence, and computational linguistics dealing with the interaction between computers and human (natural) languages. Further, natural language processing is the ability of a computer program to understand human speech as it is spoken. Even further, natural language processing allows for the analyzing, understanding and generating of languages that humans use naturally in order to interface with computers in both written and spoken contexts using natural human languages instead of computer languages.

API program 112 determines API(s) (step 210). In other words, API program 112 determines a group of storyboards or API(s) that will solve the request received previously. In an embodiment, API program 112 may use a machine learning model, discussed previously, to determine a group of storyboards or API(s) that will solve the request received previously. API program 112, via the machine learning model, will determine a group of storyboards or API(s) that will solve the request received previously using one or more of the following: preset storyboards created by users to perform specific tasks, information about storyboards and API(s) that are found in existing applications that have been analyzed by the machine learning model to determine what tasks are performed by the storyboards and API(s), orders of storyboards and API(s) based on storyboards and API(s) found in existing applications analyzed by the machine learning model, information about links between APIs, and how data is passed between API(s). In an embodiment, the machine learning model used by API program 112 may be specific to a user, a group of users, or specific for certain type of storyboard in an application to be created (i.e., commerce, security, etc.).

API program 112 presents API(s) (step 215). In other words, API program 112 presents at least one determined storyboard to the user that will solve the request received previously. In an embodiment, API program 112 can provide only one storyboard to the user. In an embodiment, API program 112 can provide multiple storyboards to the user. In an embodiment, API program 112 can provide only a single API to the user.

In an example, as shown in user interface 300, API program 112 returns two possible storyboards in response to the question "How can I add checkout to my current web application?" 302, discussed previously. The first storyboard, Retail checkout APIs 310 includes a Product 1—Commerce storyboard 312, Product 2—Tax storyboard 314, and Product 3—Address verify storyboard 316. Product 1—Commerce storyboard 312 includes a plurality of APIs: AddToCart API, CheckInventory API, UpdateCartPrice API, AddCouponPromotion API, GetShippingCarriers API, SetShippingCarriers API, SetShippingAdress API, and GetPaymentMethods API. Product 2—Tax storyboard 314 includes a single API: CalculateTax API (vendor1). Product 3—Address verify storyboard 316 includes a single API: VerifyAddress API. The second storyboard, Electronic Goods checkout APIs 320 includes a Product 1—Commerce storyboard 322, Product 2—Payment storyboard 324, and Product 3—Address verify storyboard 326. Product 1—Commerce storyboard 322 includes a plurality of APIs: AddToCart API, CheckInventory API, UpdateCartPrice API, AddCouponPromotion API, GetShippingCarriers API, SetShippingCarriers API, and SetShippingAdress API. Product 2—Payment storyboard 324 includes a single API: capturePaymentAPI (vendor1). Product 3—Address verify storyboard 326 includes a single API: VerifyAddress API.

In an embodiment, user interface 300 includes explore 317 and explore 327 which allow a user to explore Retail checkout APIs 310 and Electronic Goods checkout APIs 320, respectively. Additionally, explore 317 and explore 327 allow a user to modify and/or edit any storyboards or add/remove APIs from storyboards. In an embodiment, user interface 300 includes provision 318 and provision 328 which allows a user to indicate that they choose the supplied storyboards and send the storyboards to another program to provision the APIs into applications.

API program 112 determines whether the user would like to filter the presented API(s) (decision block 220). If there is a determination that the presented API(s) do not need to be filtered (decision block 220, no branch), the user may then select one for provisioning and processing ends. If there is a determination that there that the presented API(s) need to be filtered (decision block 220, yes branch), then API program 112 determines modified API(s) (step 225). In an embodiment, the determination is made by a selection of a user. In an embodiment, if API program 112 determines that the presented API(s) need to be filtered, API program 112 receives an indication as to how to filter the presented API(s). For example, as shown in user interface 300, a user can indicate an industry 330 filter that includes a Finance filter, a Retail filter and an Electronic goods filter. Additionally, the example allows a user to indicate a software product 340 filter that includes a Commerce filter, a Health care filter, and a social media filter.

API program 112 determines modified API(s) (decision block 220). In other words, API program 112 determines modified groups of storyboards or API(s) that will solve the request received previously but are modified based on the filters received from the user. In an embodiment, the modified API(s) may include a new group of storyboards or API(s) that are different than the group of storyboards or API(s) determined in step 210. In an embodiment, the modified API(s) may include some of the previously determined group of storyboards or API(s) in step 210 and new storyboards or API(s) that are different than the previously determined storyboards or API(s). In an embodiment, the modified API(s) may include some, but not all, of the previously determined group of storyboards or API(s) in step 210.

API program 112 presents modified API(s) (step 230). In other words, API program 112 presents at least one determined modified storyboard to the user that will solve the request received previously. In an embodiment, API program 112 can provide only one modified storyboard to the user. In an embodiment, API program 112 can provide multiple modified storyboards to the user. In an embodiment, API program 112 can provide only a single modified API to the user. In an embodiment, API program 112 can receive an indication to explore or provision the modified storyboard, similar to discussed in reference to step 215.

In any embodiment, API program 112 may update the machine learning model based upon input made by a user. For example, the machine learning model may be updated if the user decides to remove an API from a determined storyboard. In other words, if API program 112 determines a storyboard that includes API A, API B, API C, and API D to solve problem Z and the user deletes API C and provisions API A, API B, and API D to solve problem Z, API program 112 will update the machine learning model, and may, for the next request to solve problem Z form a user, only present API A, API B, and API D.

In another example, the request might be "What APIs are used for a typical product display page?" Here, the order of the APIs matters. API program 112 may return two different storyboards, one for business to consumer (Retail) and another for business to business (Pharmaceuticals). In the example, Business to Consumer APIs may include: Product 1: GetProductDetails API, GetAssociatedImages API, CheckInventory API. Product 2: EstimateTax API. Product 3: EstimateShipping API. Product 4: GetRatingAndReviewsAPI. In the example, a more Business to Business centric storyboard may have APIs such as: Product 1: GetProductDetails API, GetAssociatedImages API, CheckInventory, CheckContractEntitlement API, GetContractPrice API. Product 2: EstimateTax API. Product 3: EstimateShipping API.

FIG. 3 depicts computer system 400, that is an example of a system that includes API program 112. Computer system 400 includes processors 401, cache 403, memory 402, persistent storage 405, communications unit 407, input/output (I/O) interface(s) 406 and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention may be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface 406 may provide a connection to external devices 408 such as a keyboard, keypad, a touch screen, and/or some other suitable input device. External devices 408 can also include portable computer readable storage media such as, for example, thumb drives, portable optical or magnetic disks, and memory cards. Software and data used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method for predicting application programming interface storytelling mapping, the method comprising the steps of:

receiving, by one or more computer processors, a first indication from a user, wherein the indication includes a task to be added to an application programming interface storytelling mapping, wherein storytelling mapping is an organized layout of multiple application programming interface, and wherein the task is performed by an application program interface component;

determining, by one or more computer processors, a machine learning model;

determining, by one or more computer processors, at least one application programming interface component using the machine learning model and the task;

providing, by one or more computer processors, two or more application storytelling mapping to the user, wherein each of the two or more application storytelling mapping includes the at least one application programming interface;

receiving, by one or more computer processors, a second indication from the user, wherein the second indication is a filter; and responsive to receiving the second indication from the user, updating, by the one or more computer processors, the two or more application storytelling mapping using the machine learning model, the task, and the filter; and providing, by one or more computer processors, the updated two or more application storytelling mapping to the user.

2. The method of claim 1, wherein the step of determining, by one or more computer processors, a machine learning model comprise:

creating, by one or more computer processors, one or more machine learning models using one or more of the following: information about at least one preset existing application programming interface created to perform at least one task, information about at least one existing application programing interface used in an existing at least one application and an associated task performed by the existing at least one application, information about an order of the at least one application programming interface used in the existing at least one applications, information about links between the at least one application programming interface, and information about how data is passed between the at least one application programming interface; and determining, by one or more computer processors, a machine learning model of the at least one or more machine models based on one or more of the following: the user or the task.

3. The method of claim 1, wherein the at least one application programming interface is in a first order to perform the task.

4. The method of claim 1, wherein the first indication is analyzed using natural language processing to determine the task.

5. The method of claim 2, further comprising:
receiving, by one or more computer processors, at least one update to one or more of the following: information about at least one preset existing application programming interface created to perform at least one task, information about at least one existing application programing interface used in an existing at least one application and an associated task performed by the existing at least one application, information about an order of the at least one application programing interface used in the existing at least one applications, information about links between the at least one application programming interface, and information about how data is passed between the at least one application programming interface; and
updating, by one or more computer processors, the one or more machine learning models based on the at least one update.

6. A computer program product for predicting application programming interface storytelling mapping, the computer program product comprising:
one or more computer readable storage media; and
program instructions stored on the one or more computer readable storage media, the program instructions comprising:
program instructions to receive a first indication from a user, wherein the indication includes a task to be added to an application programming interface storytelling mapping, wherein storytelling mapping is an organized layout of multiple application programming interface, and wherein the task is performed by an application program interface component;
program instructions to determine a machine learning model;
program instructions to determine at least one application programming interface using the machine learning model and the task;
program instructions to provide two or more application storytelling mapping to the user, wherein each of the two or more application storytelling mapping includes the at least one application programming interface;

program instructions to receive a second indication from the user, wherein the second indication is a filter; and
program instructions, responsive to receiving the second indication, to update the two or more application storytelling mapping using the machine learning model, the task, and the filter; and
program instructions to provide the updated two or more application storytelling mapping to the user.

7. The computer program product of claim 6, wherein the program instructions to determine a machine learning model comprise:
program instructions to create one or more machine learning models using one or more of the following: information about at least one preset existing application programming interface created to perform at least one task, information about at least one existing application programming interface used in an existing at least one application and an associated task performed by the existing at least one application, information about an order of the at least one application programing interface used in the existing at least one applications, information about links between the at least one application programming interface, and information about how data is passed between the at least one application programming interface; and
program instructions to determine a machine learning model of the at least one or more machine models based on one or more of the following: the user or the task.

8. The computer program product of claim 6, wherein the at least one application programming interface is in a first order to perform the task.

9. The computer program product of claim 6, wherein the first indication is analyzed using natural language processing to determine the task.

10. The computer program product of claim 7, further comprising program instructions, stored on the one or more computer readable storage media, to:
receive at least one update to one or more of the following: information about at least one preset existing application programming interface created to perform at least one task, information about at least one existing application programing interface used in an existing at least one application and an associated task performed by the existing at least one application, information about an order of the at least one application programing interface used in the existing at least one applications, information about links between the at least one application programming interface, and information about how data is passed between the at least one application programming interface; and
update the one or more machine learning models based on the at least one update.

11. A computer system for predicting application programming interface storytelling mapping, the computer system comprising:
one or more computer processors;
one or more computer readable storage media; and
program instructions stored on the one or more computer readable storage media for execution by at least one of the one or more computer processors, the program instructions comprising:
program instructions to receive a first indication from a user, wherein the indication includes a task to be added to an application programming interface storytelling mapping, wherein storytelling mapping is an organized layout of multiple application programming interface, and wherein the task is performed by an application program interface component;

program instructions to determine a machine learning model;

program instructions to determine at least one application programming interface using the machine learning model and the task;

program instructions to provide two or more application storytelling mapping to the user, wherein each of the two or more application storytelling mapping includes the at least one application programming interface;

program instructions to receive a second indication from the user, wherein the second indication is a filter; and program instructions, responsive to receiving the second indication, to update the two or more application storytelling mapping using the machine learning model, the task, and the filter; and program instructions to provide the updated two or more application storytelling mapping to the user.

12. The computer system of claim 11, wherein the program instructions to determine a machine learning model comprise:

program instructions to create one or more machine learning models using one or more of the following: information about at least one preset existing application programming interface created to perform at least one task, information about at least one existing application programing interface used in an existing at least one application and an associated task performed by the existing at least one application, information about an order of the at least one application programing interface used in the existing at least one applications, information about links between the at least one application programming interface, and information about how data is passed between the at least one application programming interface; and program instructions to determine a machine learning model of the at least one or more machine models based on one or more of the following: the user or the task.

13. The computer system of claim 11, wherein the at least one application programming interface is in a first order to perform the task.

14. The computer system of claim 12, further comprising program instructions stored on the one or more computer readable storage media for execution by at least one of the one or more computer processors, to:

receive at least one update to one or more of the following: information about at least one preset existing application programming interface created to perform at least one task, information about at least one existing application programing interface used in an existing at least one application and an associated task performed by the existing at least one application, information about an order of the at least one application programing interface used in the existing at least one applications, information about links between the at least one application programming interface, and information about how data is passed between the at least one application programming interface; and update the one or more machine learning models based on the at least one update.

\* \* \* \* \*